(12) United States Patent
Büsch et al.

(10) Patent No.: US 8,763,208 B2
(45) Date of Patent: Jul. 1, 2014

(54) DEVICE FOR CONNECTING AT LEAST TWO BELTS

(75) Inventors: Martin Büsch, Efringen-Kirchen (DE);
Jan-Christian Risy, Binzen (DE);
Friedrich Silbereisen, Efringen-Kirchen (DE); Patrice Burg, Steinbrunn-le-Bas (FR)

(73) Assignee: A. Raymond et Cie, Grenoble (FR)

( * ) Notice: Subject to any disclaimer, the term of this patent is extended or adjusted under 35 U.S.C. 154(b) by 337 days.

(21) Appl. No.: 13/201,129

(22) PCT Filed: Apr. 10, 2010

(86) PCT No.: PCT/EP2010/002234
§ 371 (c)(1),
(2), (4) Date: Aug. 11, 2011

(87) PCT Pub. No.: WO2010/124790
PCT Pub. Date: Nov. 4, 2010

(65) Prior Publication Data
US 2012/0124780 A1    May 24, 2012

(30) Foreign Application Priority Data
Apr. 29, 2009    (DE) .......................... 10 2009 019 382

(51) Int. Cl.
*F16G 3/00* (2006.01)
*F16G 3/16* (2006.01)

(52) U.S. Cl.
CPC ........................................ *F16G 3/16* (2013.01)
USPC ..................... 24/35; 24/31 R; 24/32

(58) Field of Classification Search
CPC ......................................................... F16G 3/16

USPC ............. 24/31 R, 32 R, 35, 32; 474/255, 257
See application file for complete search history.

(56) References Cited

U.S. PATENT DOCUMENTS

| 2,069,362 A | 2/1937 | Ford |
| 2,404,041 A | 7/1946 | Coats |
| 2,430,328 A | 11/1947 | Daniels |
| 5,391,121 A | 2/1995 | Schramm |

(Continued)

FOREIGN PATENT DOCUMENTS

| DE | 3238266 A1 | 4/1984 |
| DE | 4417668 A1 | 11/1995 |
| DE | 69301912 T2 | 10/1996 |
| EP | 0764797 A1 | 3/1997 |

OTHER PUBLICATIONS

International Search Report and Written Opinion mailed Jul. 15, 2010 in the parent International application No. PCT/EP2010/~002234.

*Primary Examiner* — Robert J Sandy
(74) *Attorney, Agent, or Firm* — Faegre Baker Daniels LLP

(57) ABSTRACT

A device for connecting at least two belts, the belts having transversely oriented connecting bars. The device includes at least one longitudinal wall and at least one edge wall opposite the longitudinal wall and formed on a base plate. Hold-down means are present between each longitudinal wall and each edge wall. At least one of the longitudinal walls and the edge walls has at least one attaching recess in which at least one connecting bar is inserted for securing belts retained by the hold-down means in the area of the base plate against displacing in the longitudinal direction.

12 Claims, 5 Drawing Sheets

(56) References Cited

U.S. PATENT DOCUMENTS

| | | | |
|---|---|---|---|
| 6,896,430 B2 * | 5/2005 | Williams | 474/202 |
| 7,810,219 B2 * | 10/2010 | Lindemann | 24/31 R |
| 2008/0060171 A1 * | 3/2008 | Lindemann | 24/31 R |
| 2010/0325965 A1 * | 12/2010 | Hawkins et al. | 24/35 |
| 2012/0124780 A1 * | 5/2012 | Busch et al. | 24/35 |
| 2013/0143705 A1 * | 6/2013 | Wolf | 24/31 R |

* cited by examiner

DEVICE FOR CONNECTING AT LEAST TWO BELTS

CROSS-REFERENCE TO RELATED APPLICATION

This application is a U.S. National Phase Patent Application based on International Application Serial No. PCT/EP2010/002234 filed Apr. 10, 2010, the disclosure of which is hereby explicitly incorporated by reference herein.

BACKGROUND OF THE INVENTION

1. Field of the Invention

The present invention relates to a device for connecting at least two belts.

2. Description of the Related Art

From US 2008/0060171 A1, a device for connecting two belts that is accomplished by two U-shaped head bolts is known. The head bolts can be connected with each other by a screw, whereby when this connection is established, the ends of the two belts that are inserted between the head bolts are connected with each other by jamming.

SUMMARY OF THE INVENTION

The present invention provides a device for connecting two belts that are designed with two transversely oriented connecting bars, which differentiates itself by its cost-effective production, as well as simple handling by means of reliably connecting the ends of the belts.

Thereby, that in the device according to the invention, only a single component and thus a component leading to a cost-effective device is present, into which the belts can be inserted by engaging the connecting bars with the attachment recesses, and subject to being fixed by the hold-down means, the belts can be reliably connected with each other by means of a few easily performed hand movements.

In one form thereof, the present invention provides a device for connecting at least two belts having transversely oriented connecting bars, wherein at least one longitudinal wall and at least one edge wall opposite the longitudinal wall are formed on a base plate. Hold-down means are present between the or each longitudinal wall and the or each edge wall. One of the longitudinal walls and/or one of the edge walls has or have at least one attaching recess in which at least one connecting bar is inserted for securing belts retained by the hold-down means in the area of the base plate against displacing in the longitudinal direction.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
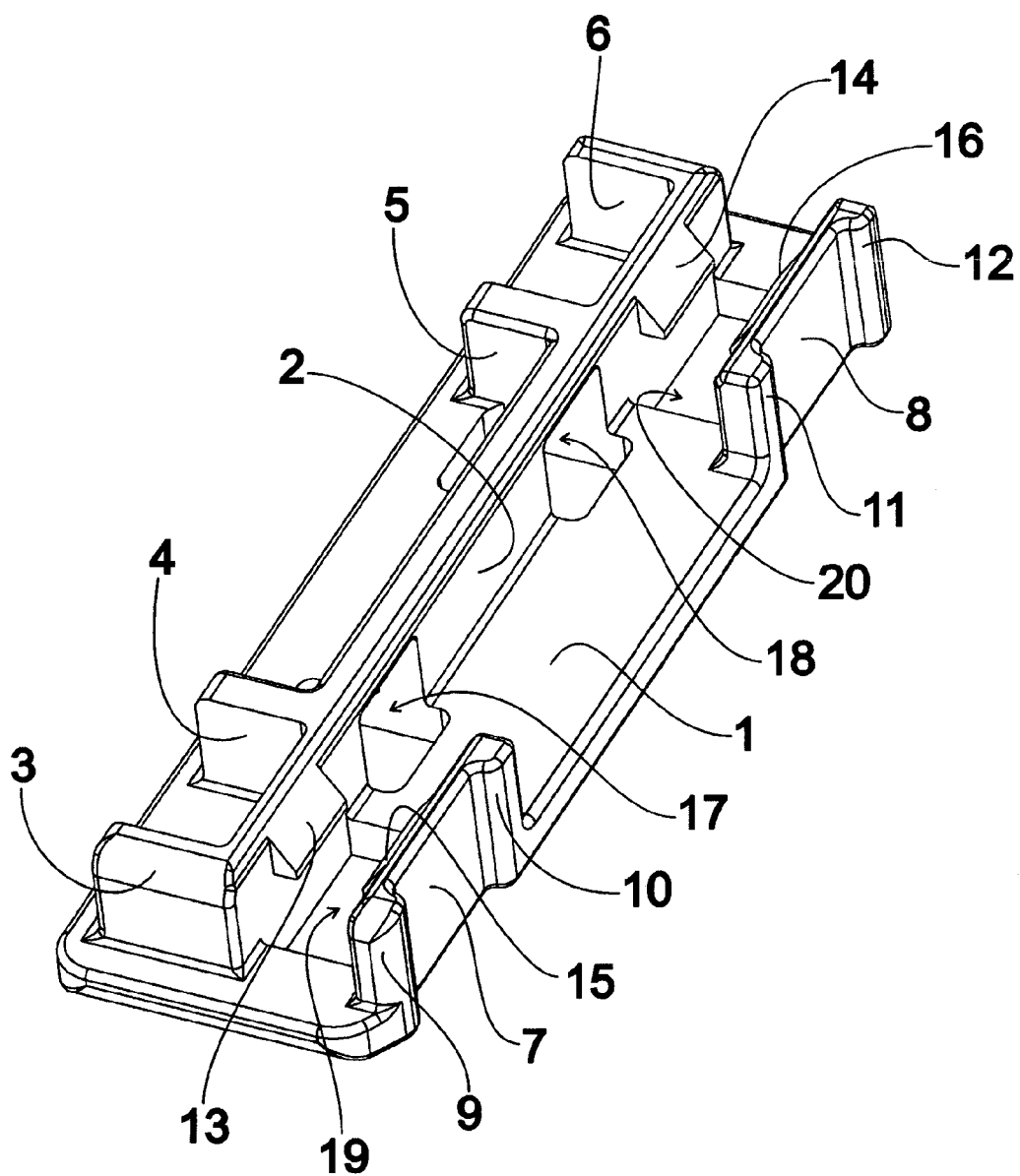
FIG. 1 shows a perspective view of a first exemplary embodiment of a device according to the invention for connecting two belts.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows a perspective view of a first exemplary embodiment of a device according to the invention. The exemplary embodiment according to FIG. 1 is made of energy-elastic plastic and has a rectangular base plate 1 in this exemplary embodiment, at which on one side a single projecting longitudinal wall 2 is integrally molded in the longitudinal direction of base plate 1 and perpendicular to base plate 1. In this exemplary embodiment, the longitudinal wall 2 is located essentially in the center of base plate 1.

Further, the device according to FIG. 1 has a number of longitudinal wall reinforcement ribs 3, 4, 5, 6 that extend on one side of longitudinal wall 2 in the transverse direction of base plate 1, essentially up to the edge of base plate 1. In this exemplary embodiment, respectively one longitudinal wall reinforcement rib 3, 6 is located at opposite ends of longitudinal wall 2, while the two other longitudinal reinforcement ribs 4, 5 lie offset at a respectively equal distance from the longitudinal wall reinforcement ribs 3, 6 at the end, in the direction of the center of longitudinal wall 2.

On the side of longitudinal wall 2 that is facing away from longitudinal wall reinforcement ribs 3, 4, 5, 6, the device according to the invention as per FIG. 1 has edge walls 7, 8 located at the end of one longitudinal side of base plate 1 that are located at a distance in the transverse direction of base plate 1 with respect to longitudinal wall 2. Edge walls 7, 8 are braced by respectively two edge wall reinforcement ribs 9, 10, 11, 12 located at the end, pointing away from longitudinal wall 2, in order to increase the bending resistance of edge walls 7, 8. As can be seen in the illustration according to FIG. 1, edge walls 7, 8 essentially extend over the end sections of longitudinal wall 2, which are likewise reinforced by longitudinal wall reinforcement ribs 3, 4, 5, 6.

It can be seen in FIG. 1 that on the sides of longitudinal wall 2 or edge walls 7, 8, in thereby formed U-shaped receiving sections between longitudinal wall reinforcement ribs 3, 4, 5, 6 or between edge wall reinforcement ribs 9, 10, 11, 12, respectively one hold-down nose 13, 14, 15, 16 is designed as hold-down element that respectively has on its side facing base plate 1, a stop side oriented parallel to base plate 1, and on the side facing away from base plate 1, a chamfered insertion side.

Finally, it can be seen in FIG. 1 that in this exemplary embodiment, in longitudinal wall 2 between longitudinal wall reinforcement ribs 4, 5 that lie on the inner side in this exemplary embodiment, directly adjacent to these longitudinal wall reinforcement ribs 4, 5, an attachment recess 17, 18 is formed respectively, which breaks through longitudinal wall 2.

In the receiving sections that are positioned between the sides of longitudinal wall 2 pointing toward each other and edge walls 7, 8, base plate 1 respectively has a slider recess 19, 20 for removal purposes, in order to eject the hold-down element (13, 14, 15, 16).

Figure 2:
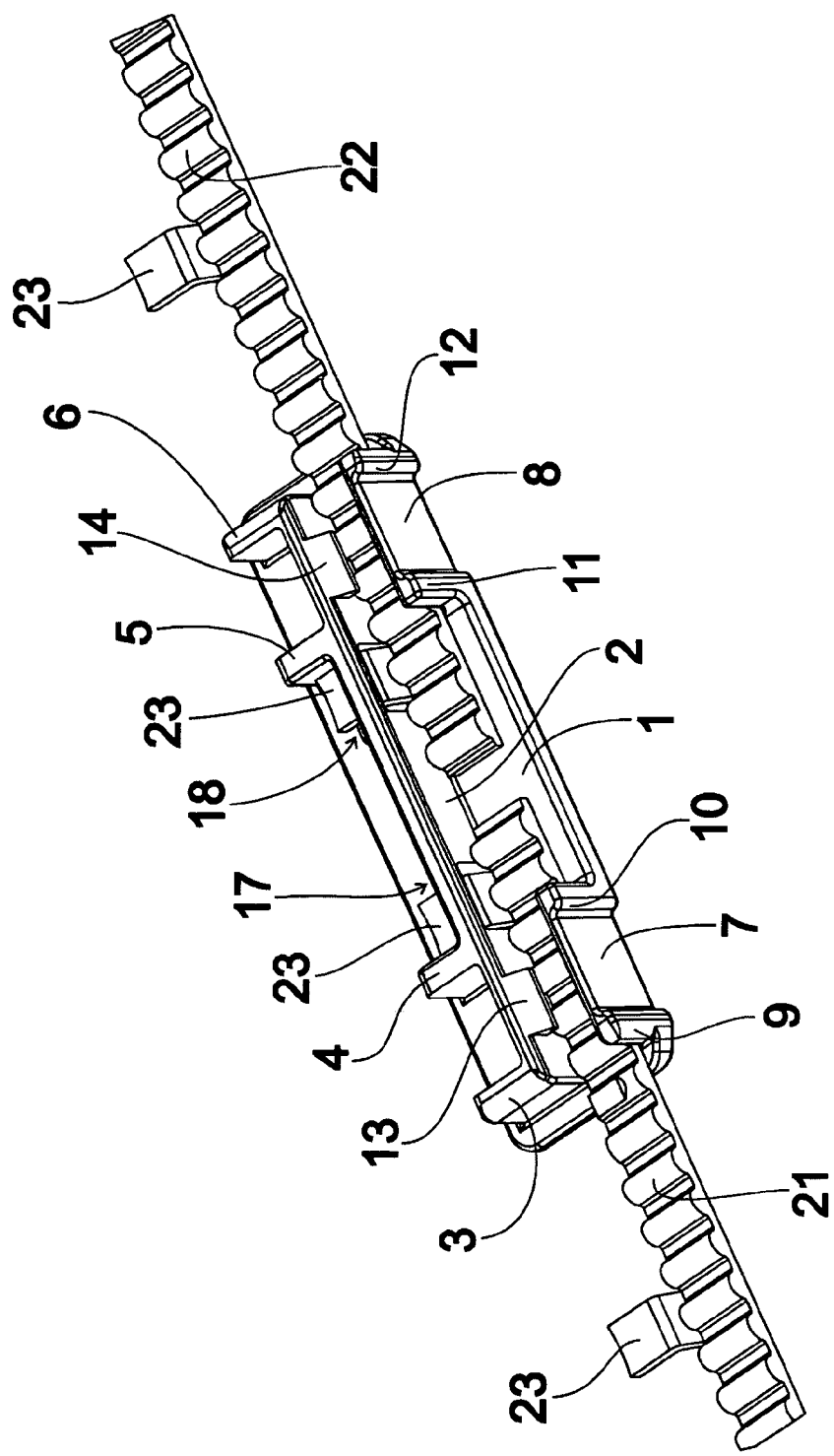
FIG. 2 shows a perspective view of the first exemplary embodiment according to FIG. 1 with the ends of two belts inserted as intended.

FIG. 2 shows a perspective view of the exemplary embodiment in a device according to the invention as per FIG. 1 with two belts 21, 22, that are designed with connecting bars 23 that extend at regular distances transverse to belts 21, 22. At connecting bars 23, components are or were mounted that are not shown in FIG. 1 that are transported or have been transported with belts 21, 22, which typically have a tooth structure. In manipulations of this type it is sometimes necessary to connect the ends of belts 21, 22 with each other.

To do so, in a use of the device as intended according to the invention, the ends of belts 21, 22 are inserted between longitudinal wall 2 and edge walls 7, 8 in such a way, that a connection bar 23 of a belt 21, 22 respectively engages with one attachment recess 17, 18 and belts 21, 22, after being pressed between hold-down noses 13, 14, 15, 16, are located between base plate 1 and the stop sides of hold-down noses 13, 14, 15, 16 facing base plate 1. Thus, belts 21, 22 are secured against displacement in the longitudinal direction, as well as also against an unintentional movement away from base plate 1.

Figure 3:
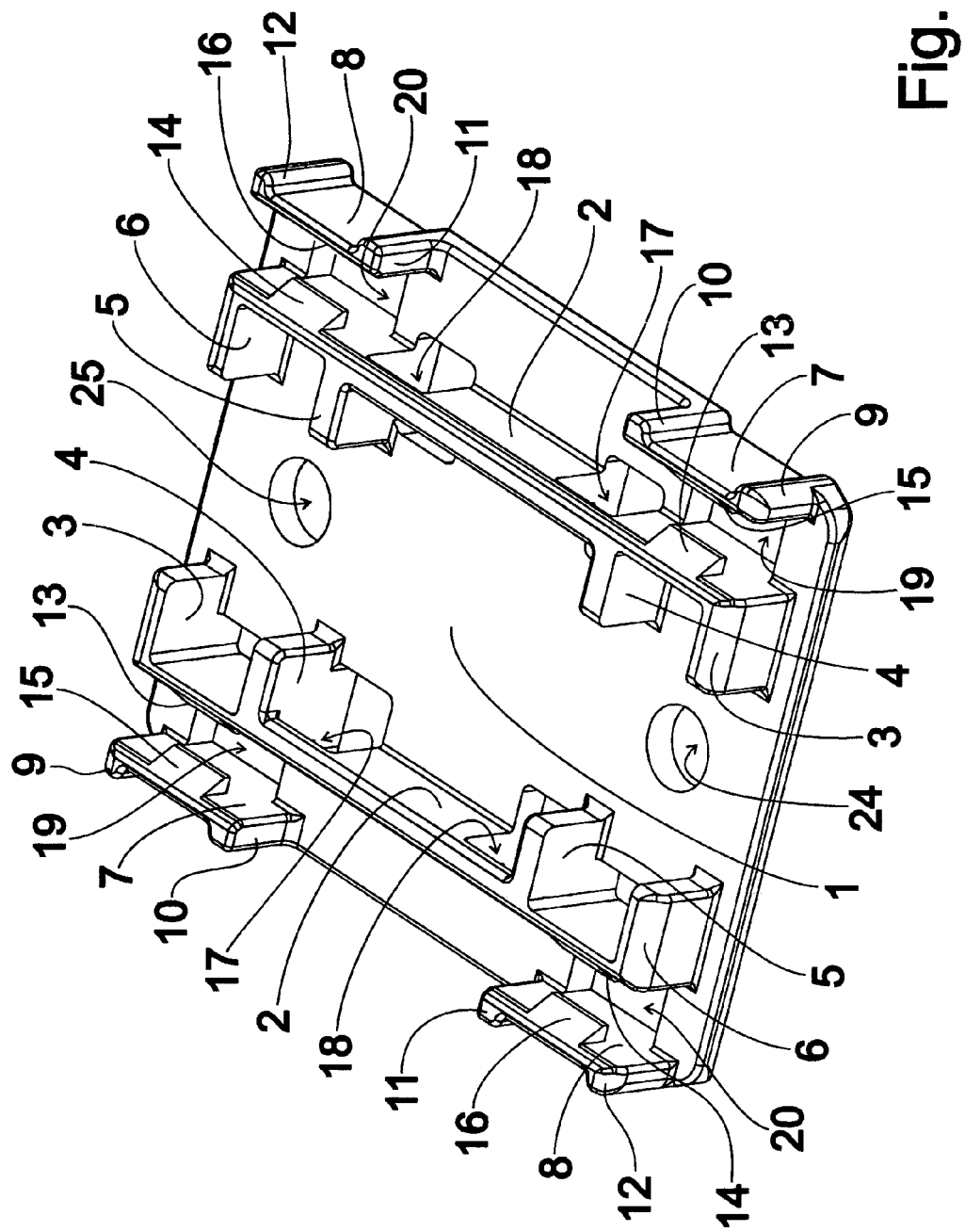
FIG. 3 shows a perspective view of a second exemplary embodiment of a device according to the invention for connecting a maximum of four belts.

In a perspective view, FIG. 3 shows a second exemplary embodiment of a device according to the invention that is essentially designed, in contrast to the exemplary embodiment according to FIG. 1 with an enlarged, approximately square base plate 1 with the same, as well as correspondingly located, but double the number of super-structural components than the exemplary embodiment according to FIG. 1, whereby the edge wall reinforcement ribs 9, 10, 11, 12 are located opposite to each other. Thereby, the exemplary embodiment according to FIG. 3 is designed with four receiving sections formed by the two longitudinal walls 2 and the in total four edge walls 7, 8.

Base plate 1 in the exemplary embodiment according to FIG. 3 is also designed with a number of fastening recesses 24, 25, in order to mount base plate 1, for example, with a screw or a rivet on a carrier component—not shown in FIG. 3—such as a belt drum for storing belts 21, 22, in particular with components that are mounted on such.

Figure 4:
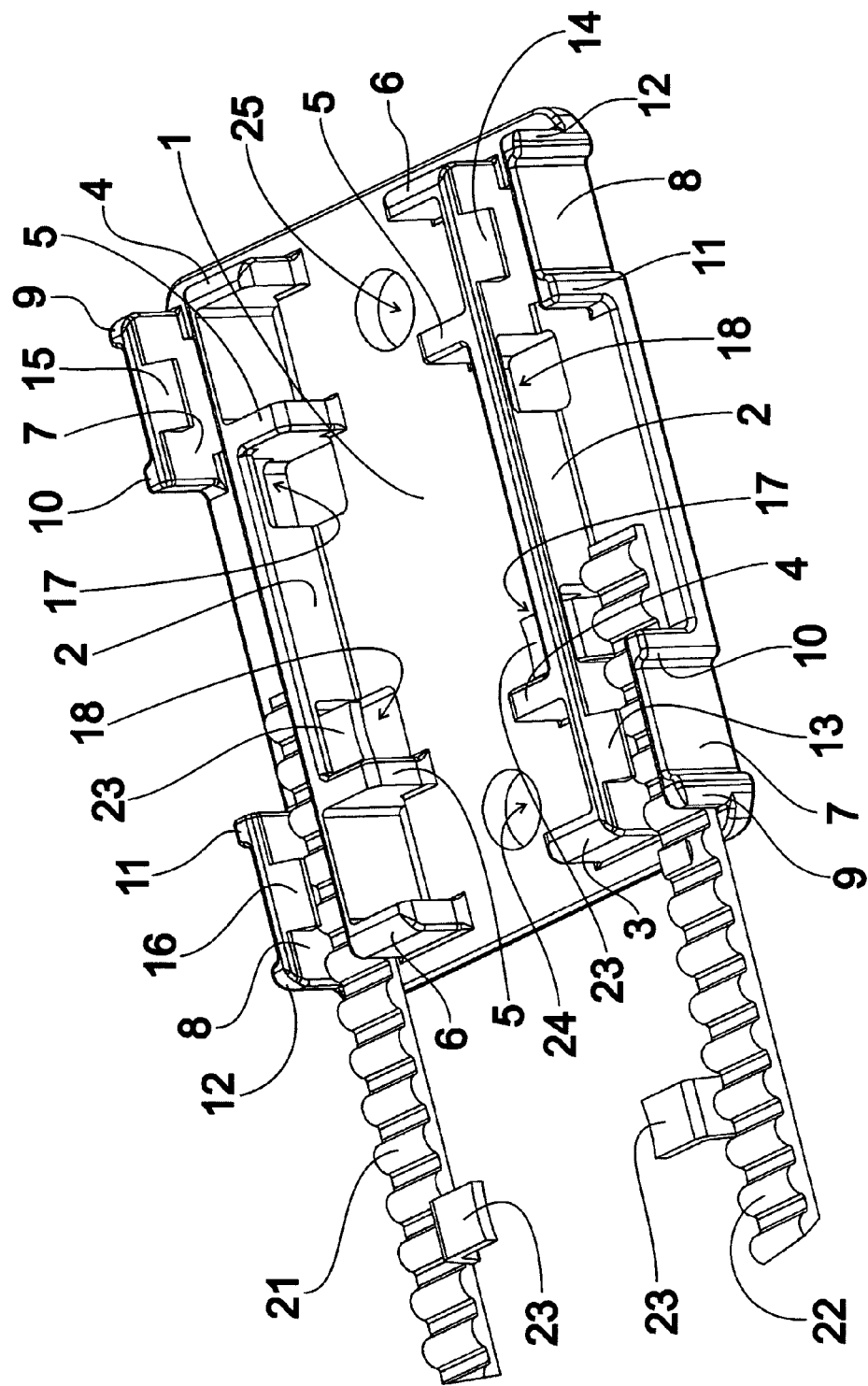
FIG. 4 shows a perspective view of the second exemplary embodiment according to FIG. 3 with two ends of belts inserted on one side.

FIG. 4 shows a perspective view of the exemplary embodiment according to FIG. 3 with two belts 21, 22 that are designed according to belts 21, 22 as shown in FIG. 2, with connection bars 23. In the configuration according to FIG. 4, belts 21, 22 are inserted between edge walls 7, 8 that lie at different edge sides of base plate 1 so that they extend away from the device according to the invention on one side. Corresponding to the configuration according to FIG. 2, respectively one connection bar 23 is located in an attachment recess 17, 18, in order to retain belts 21, 22 in a system adjacent to base plate 1 by means of hold-down elements 13, 14, 15, 16.

Figure 5:
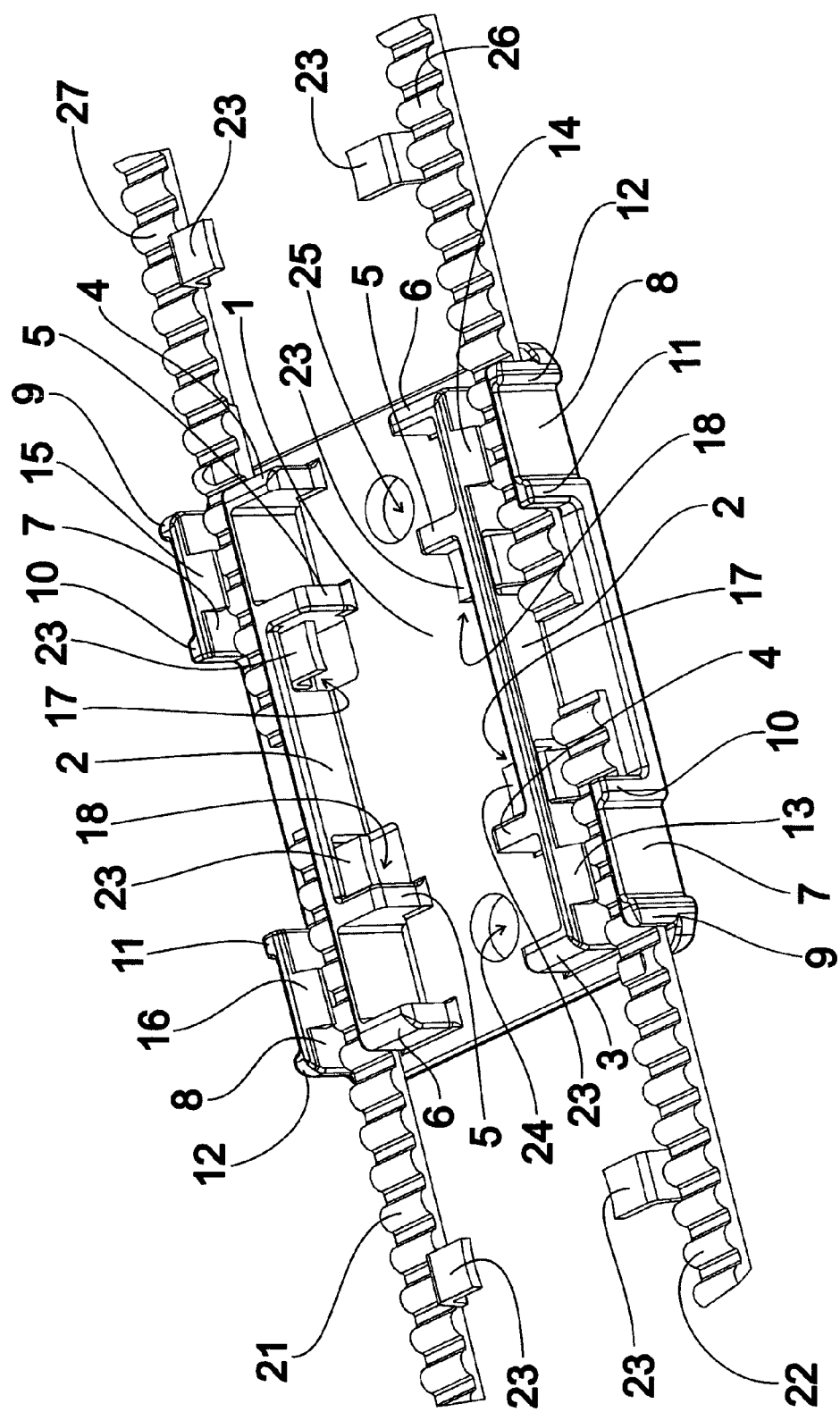
FIG. 5 shows a perspective view of the second exemplary embodiment according to FIG. 3 with four inserted ends of belts.

FIG. 5 shows a perspective view of the exemplary embodiment according to the invention as per FIG. 3, now with four belts 21, 22, 26, 27, the ends of which are inserted according to the configurations as per FIG. 2 and as per FIG. 4, into the four receiving sections formed by the facing sides of longitudinal walls 2 and edge wall 7, 8. In this way, now two pairs of belts 21, 22, 26, 27, respectively oriented parallel, can be connected with each other.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for use in connecting at least two belts each having a transversely oriented connecting bar, said device comprising:
   a base plate;
   two longitudinal walls disposed parallel with respect to each other, said longitudinal walls protruding from said base plate and extending over said base plate along a longitudinal direction;
   at least one edge wall protruding from said base plate, each said edge wall disposed opposite a respective said longitudinal wall to define a receiving section therebetween for receipt of the belt;
   at least one attachment recess in least one of said longitudinal walls and said edge walls, said at least one attachment recess dimensioned for receiving the connecting bar of the belt; and
   hold-down means disposed in said receiving section for fastening the belt.

2. The device of claim 1, wherein said hold-down means includes a hold-down nose formed between a respective said longitudinal wall and edge wall.

3. The device of claim 1, wherein at least one said longitudinal wall includes at least one reinforcement rib formed on a side thereof opposite a respective said edge wall.

4. The device of claim 1, wherein at least one said edge wall includes at least one reinforcement rib formed on a side thereof opposite a respective said longitudinal wall.

5. The device of claim 1, including a said edge wall disposed opposite each end of said single longitudinal wall.

6. The device of claim 1, including wall one of said edge walls disposed opposite each end of each of said two longitudinal walls.

7. A device for use in connecting at least two belts each having a transversely oriented connecting bar, said device comprising:
   a base plate;
   at least one longitudinal wall protruding from said base plate and extending over said base plate along a longitudinal direction;
   at least one edge wall protruding from said base plate, each said edge wall disposed opposite a respective said longitudinal wall to define a receiving section therebetween for receipt of the belt;
   at least one attachment recess is formed in said longitudinal wall, said at least one attachment recess dimensioned for receiving the connecting bar of the belt; and
   hold-down means disposed in said receiving section for fastening the belt.

8. The device of claim 7, wherein said hold-down means includes a hold-down nose formed between a respective said longitudinal wall and said edge wall.

9. The device of claim 7, wherein at least one said longitudinal wall includes at least one reinforcement rib formed on a side thereof opposite a respective said edge wall.

10. The device of claim 7, wherein at least one said edge wall includes at least one reinforcement rib formed on a side thereof opposite a respective said longitudinal wall.

11. The device of claim 7, including one of said longitudinal walls disposed centrally of said base plate.

12. The device of claim 11, including one of said edge walls disposed opposite each end of said single longitudinal wall.

* * * * *

UNITED STATES PATENT AND TRADEMARK OFFICE
CERTIFICATE OF CORRECTION

| | | |
|---|---|---|
| PATENT NO. | : 8,763,208 B2 | Page 1 of 1 |
| APPLICATION NO. | : 13/201129 | |
| DATED | : July 1, 2014 | |
| INVENTOR(S) | : Martin Busch et al. | |

It is certified that error appears in the above-identified patent and that said Letters Patent is hereby corrected as shown below:

In the Claims

Claim 6, Column 4, Line 34, delete "wall"

Signed and Sealed this
Twenty-eighth Day of October, 2014

Michelle K. Lee
*Deputy Director of the United States Patent and Trademark Office*